(12) United States Patent
Makarov

(10) Patent No.: US 9,437,042 B1
(45) Date of Patent: Sep. 6, 2016

(54) SYSTEM, METHOD, AND COMPUTER PROGRAM PRODUCT FOR PERFORMING DICING ON A PRIMITIVE

(75) Inventor: Evgeny Evgenievich Makarov, Moscow (RU)

(73) Assignee: NVIDIA Corporation, Santa Clara, CA (US)

(\*) Notice: Subject to any disclaimer, the term of this patent is extended or adjusted under 35 U.S.C. 154(b) by 27 days.

(21) Appl. No.: 13/278,096

(22) Filed: Oct. 20, 2011

(51) Int. Cl.
G06T 17/20 (2006.01)
G06T 15/00 (2011.01)
G06T 15/04 (2011.01)

(52) U.S. Cl.
CPC .......... *G06T 17/20* (2013.01); *G06T 15/005* (2013.01); *G06T 15/04* (2013.01); *G06T 17/205* (2013.01)

(58) Field of Classification Search
USPC ........................................... 345/423
See application file for complete search history.

(56) References Cited

U.S. PATENT DOCUMENTS

| 2002/0065133 | A1* | 5/2002 | Nagayama | 463/32 |
| 2004/0257363 | A1* | 12/2004 | Veach | 345/423 |
| 2010/0164954 | A1* | 7/2010 | Sathe et al. | 345/423 |
| 2010/0214294 | A1* | 8/2010 | Li et al. | 345/423 |

OTHER PUBLICATIONS

C. Eisenacher and C.Loop, "Data-parallel Micropolygon Rasterization", 2010, EUrographics Association, http://research.microsoft.com/en-us/um/people/cloop/eg2010.pdf.*

K Zhou, Q Hou, Z Ren, M Gong, X Sun, B Guo, "RenderAnts: Interactive Reyes Rendering on GPUs",Dec. 2009, ACM Transactions on Graphics, vol. 28, No. 5, Article 155,http://dl.acm.org/citation.cfm?id=1618501.*
M Fisher, K Fatahalian, S Boulos, K Akerly, W Mar, Pat Hanrahan, "DiagSPlit: parallel, crack-fee, adaptive tessellation for micropolygon rendering", Dec. 2009, ACM Transactions on Graphics, vol. 28, Article No. 150; http://dl.acm.org/citation.cfm?id=1618496.*
Y Dimikopoulos, J Tsamopoulos, "A quasi-elliptic transformation for moving boundary problems with large anisotropic deformations", Jul. 2003, Elsevier, Journal of Computational Physic, vol. 192, Issue 2; http://www.sciencedirect.com/science/article/pii/S0021999103004066.*
Lenz, Ricardo, Joaquim Bento Cavalcante-Neto, and Creto Augusto Vidal. "Optimized pattern-based adaptive mesh refinement using gpu." Computer Graphics and Image Processing (SIBGRAPI), 2009 XXII Brazilian Symposium on. IEEE, 2009.*
Valdetaro, Alexandre, et al. "Understanding shader model 5.0 with directx11." IX Brazilian symposium on computer games and digital entertainment. vol. 1. No. 2. 2010.*
Sebastivansylvan, "The problem with tessellation in DirectX 11", Apr. 18, 2010, http://sebastiansylvan.com/2010/04/18/the-problem-with-tessellation-in-directx-11.*
Verwey, Johan, "Tessellation", Jan. 4, 2010, Twitter, http://fsharpplayground.blogspot.com/2010/01/tessellation.html.*

\* cited by examiner

*Primary Examiner* — Mark Zimmerman
*Assistant Examiner* — Sarah Le
(74) *Attorney, Agent, or Firm* — Zilka-Kotab, PC

(57) ABSTRACT

A system, method, and computer program product are provided for performing dicing on a primitive. In use, a primitive to be rendered is identified. Additionally, preprocessing is performed on the primitive. Further, dicing is performed on the primitive, based on the preprocessing.

16 Claims, 4 Drawing Sheets

000# SYSTEM, METHOD, AND COMPUTER PROGRAM PRODUCT FOR PERFORMING DICING ON A PRIMITIVE

FIELD OF THE INVENTION

The present invention relates to computer graphics, and more particularly to 3D models representations and rendering.

BACKGROUND

Traditionally, in the area of computer graphics, tessellation has been used in conjunction with primitives to be rendered. For example, tessellation may be used to convert primitives into structures suitable for rendering. However, current techniques for performing tessellation have been associated with various limitations.

For example, hardware tessellation may have restrictions such as maximum primitive expansion limitations, which may necessitate dividing the primitive into smaller primitives before applying tessellation. Thus tessellation may require a special model representation before it can be efficiently used. Having different representations of the same model may not be desirable in many cases. Further, the divided primitives of model used with tessellation may require additional attributes interpolation and storage, which may considerably increase the overall size of an original non-tessellated model.

There is thus a need for addressing these and/or other issues associated with the prior art.

SUMMARY

A system, method, and computer program product are provided for performing dicing on a primitive. In use, a primitive to be rendered is identified. Additionally, preprocessing is performed on the primitive. Further, dicing is performed on the primitive, based on the preprocessing.

DETAILED DESCRIPTION

Figure 1:
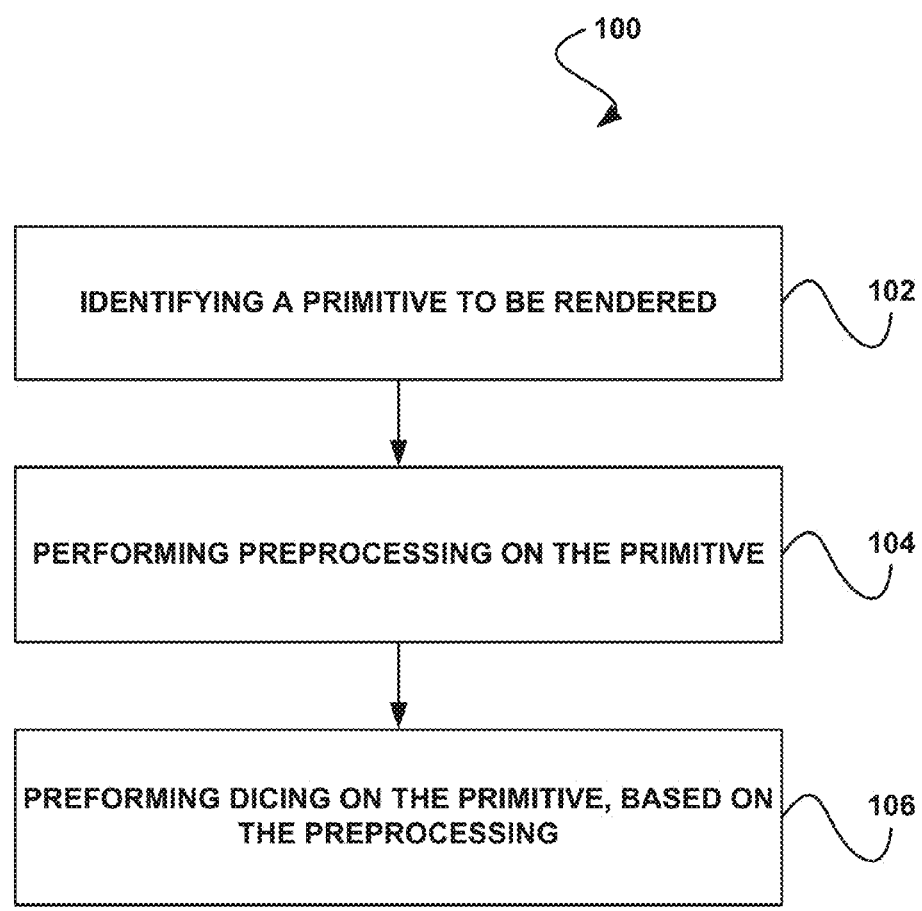
FIG. 1 shows a method for performing dicing on a primitive, in accordance with one embodiment.

FIG. 1 shows a method 100 for performing dicing on a primitive, in accordance with one embodiment. As shown in operation 102, a primitive to be rendered is identified. In one embodiment, the primitive may include any geometry patch or primitive capable of being rendered. For example, the primitive may include a simple polygon (e.g., a triangle, quad, etc.). In another embodiment, the primitive may include a render primitive which may be associated with content provided as part of a video game, a movie, or any other material to be displayed to a user.

Additionally, as shown in operation 104, preprocessing is performed on the primitive. In one embodiment, the preprocessing step may include single primitive processing, object processing, entire scene processing, etc. In another embodiment, this step may include one or more level of detail calculations to represent scene objects from a particular point of view or may include simply a predetermined number of splits (e.g., a required number of splits, etc.) per primitive.

Further, in another example, the preprocessing may include selecting a dicing pattern for the primitive, based on the calculated number of splits. In one embodiment, this dicing pattern may be selected from a plurality of pre-computed dicing patterns based on one or more criteria (e.g., a number of splits, a level of detail, etc.). In another embodiment, the plurality of pre-computed dicing patterns may be calculated on the fly or at run time. In yet another embodiment, the plurality of pre-computed dicing patterns may be pre-computed based on a polygon configuration (e.g., a triangle configuration, etc.).

Further still, in one embodiment, the preprocessing may include determining an expansion ratio for the primitive based on a number of splits and a topology. In another embodiment, the preprocessing may include determining parameterization coordinates for diced primitives. In yet another embodiment, parameterization may be specified using different domains (e.g. a triangular domain, a quad domain, etc.). For example, for a triangle primitive, dicing may be specified in a triangular domain using barycentric coordinates.

Also, as shown in operation 106, dicing is performed on the primitive, based on the preprocessing. In one embodiment, performing the dicing may include splitting an original primitive into smaller primitives using original vertex positions. Additionally, in another embodiment, performing the dicing may include per-vertex attributes interpolation other than position, like texture coordinates, normals, etc. For example, a first triangle primitive may be reduced into a plurality of smaller triangle primitives within the first triangle primitive. In another embodiment, performing the dicing may include patching a source index buffer. For example, performing the dicing may include utilizing the determined expansion ratio to patch a source index buffer used for original patches. In this way, a set of primitives may be defined with a number equal to the number of diced primitives and a set of parameterization coordinates in order to perform a correct attributes transformation in a particular domain.

Further, in one embodiment, the primitive may be rendered, utilizing the parameterization data per diced primitive. For example, hardware tessellation may be performed on a primitive (e.g., a triangle primitive, etc.) using the sub-primitives outlined by the parameterization coordinates. In this way, the dicing may be accomplished in real time, (e.g., during run-time, etc.). Additionally, dicing may be easily enabled and/or disabled depending on tessellation usage. In this way, the original model may be used for conventional rendering as well as rendering with tessellation and dicing enabled.

Further still, in another embodiment, previous rendering stages performed before the tessellation stages may remain unaffected. This may make the proposed technique orthogonal to operations performed in a vertex shader (for example, the proposed technique may be transparently applied on animated primitives, etc.). Also, methods may be provided for efficient model representation, and a way to render those models with the application of dicing and tessellation.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
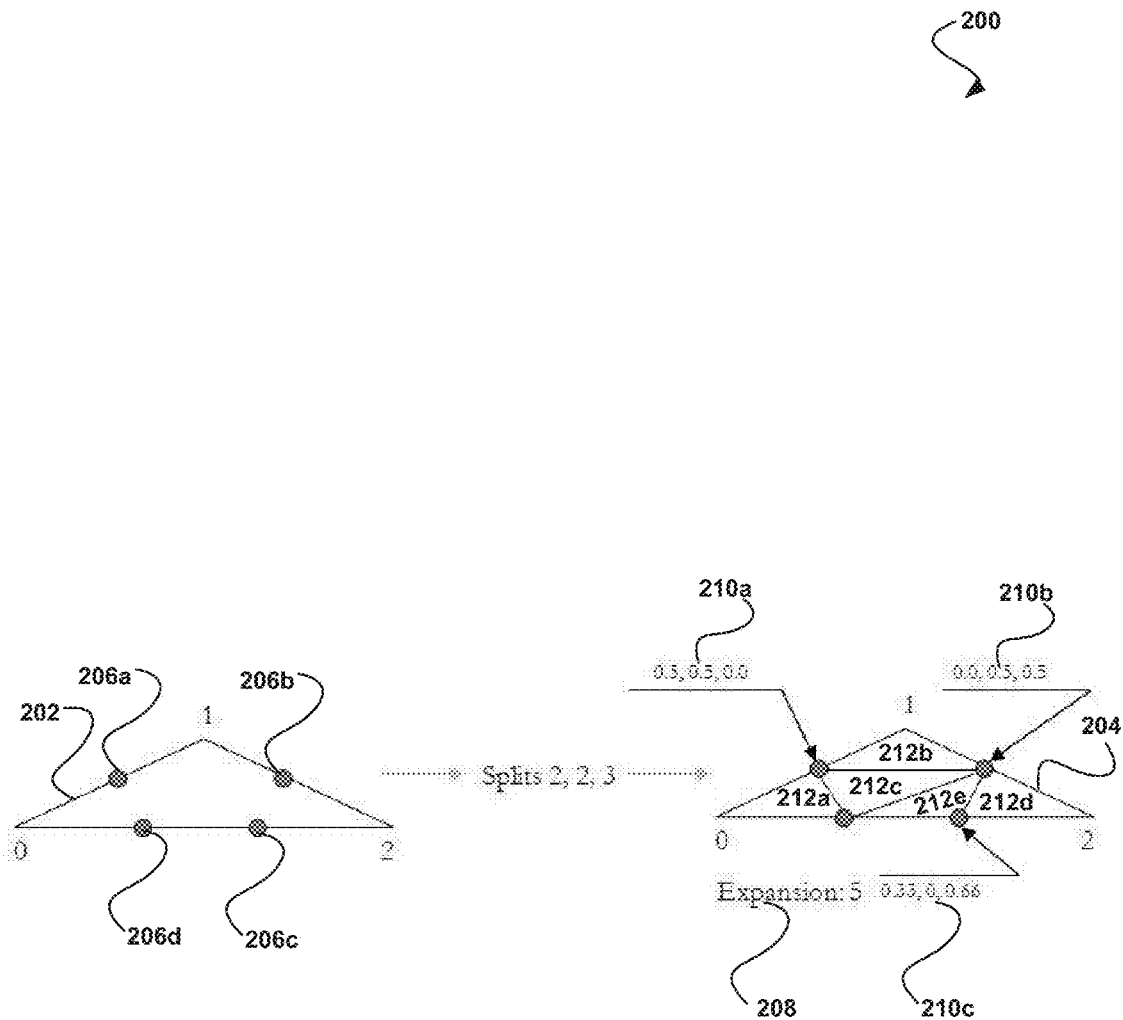
FIG. 2 shows a mesh preprocessing procedure, in accordance with another embodiment.

FIG. 2 shows a mesh preprocessing procedure 200, in accordance with another embodiment. As an option, the present procedure 200 may be carried out in the context of the functionality of FIG. 1. Of course, however, the procedure 200 may be implemented in any desired environment. It should also be noted that the aforementioned definitions may apply during the present description.

As shown, an identified primitive 202 is preprocessed to produce a preprocessed primitive 204. For example, splits 206a-d are determined for the primitive 202, and based on the number of splits 206a-d, a precomputed tessellation pattern is selected for the identified primitive 202. Additionally, based on the selected tessellation pattern, an expansion ratio 208 (e.g., the ratio of resulting primitives 212a-e from the tessellation pattern to the original primitive, etc.) is determined.

Further, barycentric coordinates 210a-c are determined for the resulting primitives 212a-e. In one embodiment, the barycentric coordinates 210a-d may be determined utilizing a desired topology. In this way, the resulting primitives 212a-e may be parameterized, using the barycentric coordinates 210a-d for a triangular domain of the original primitive.

Figure 3:
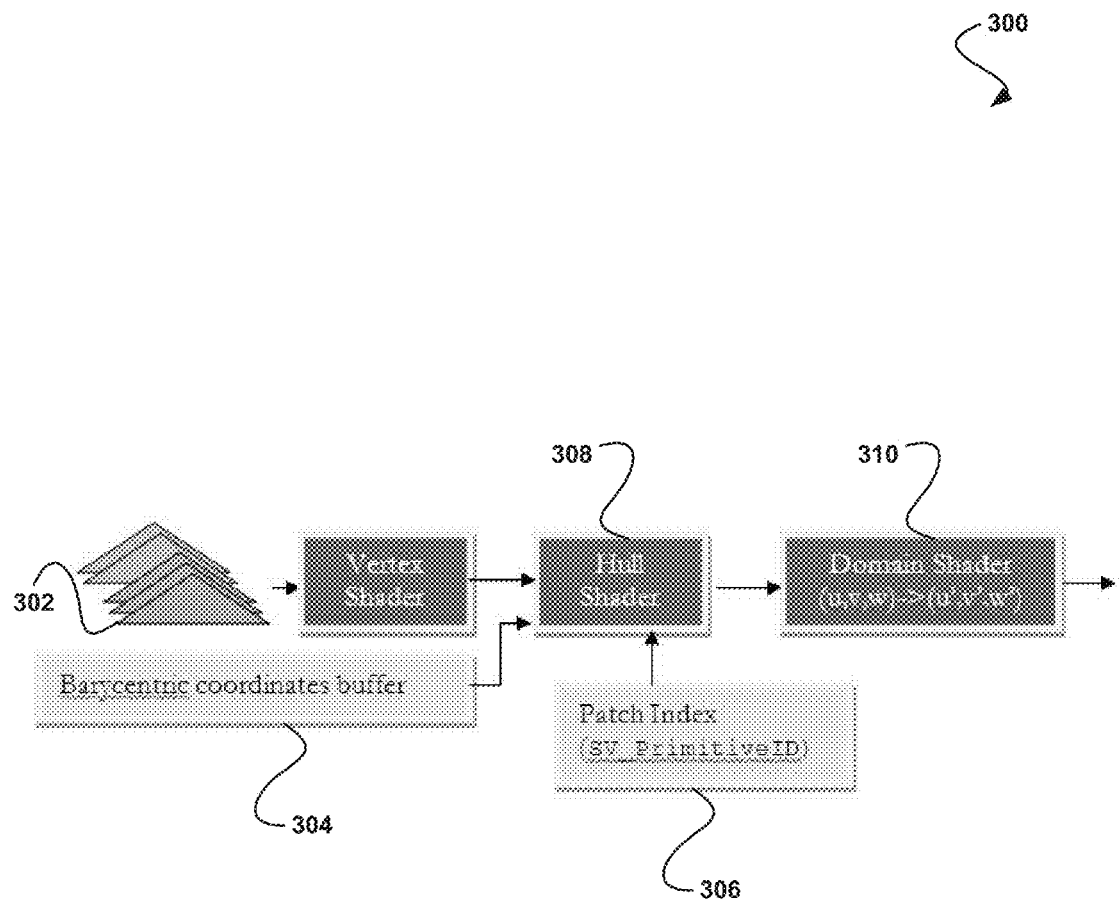
FIG. 3 shows a pipeline for virtual dicing, in accordance with yet another embodiment.

FIG. 3 shows a pipeline 300 for virtual dicing, in accordance with another embodiment. As an option, the present pipeline 300 may be carried out in the context of the functionality of FIGS. 1 and 2. Of course, however, the pipeline 300 may be implemented in any desired environment. It should also be noted that the aforementioned definitions may apply during the present description.

As shown, as set of duplicate primitives 302 are created. In one embodiment, the set of duplicate primitives 302 may be created based on an expansion ration determined during primitive preprocessing. In another embodiment, each of the duplicate primitives 302 may be assigned its own set of barycentric coordinates (e.g., three coordinates per primitive, which may equate to one set per vertex, with three vertices, etc.).

Additionally, a barycentric coordinates buffer 304 and a primitive index 306 are used within the pipeline 300 by a hull shader 308 and a domain shader 310. In one embodiment, the pipeline 300 may be modified such that the hull shader 308 and domain shader 310 use barycentric coordinates for vertices of resulting primitives from the barycentric coordinates buffer 304 to take a modified basis into account.

Table 1 illustrates exemplary pseudocode for a hull shader, in accordance with one embodiment. Of course, it should be noted that the pseudocode shown in Table 1 is set forth for illustrative purposes only, and thus should not be construed as limiting in any manner.

TABLE 1

```
//////////////////////////////////////////////////
//
// Transformations in hull shader
//////////////////////////////////////////////////
//
// outAttribute - output attribute
// inAttribute - input attribute
// barycentrics - barycentric coordinates of diced triangle primitive
template <typename T>
```

TABLE 1-continued

```
void TransformAttribute(out T outAttribute[3], in T inAttribute[3], in
float3 barycentrics[3])
{
    for (int i=0; i<3; ++i)
    {
        outAttribute[i] = inAttribute * barycentrics[i].x +
inAttribute * barycentrics[i].y + inAttribute * barycentrics[i].z;
    }
}
```

In one embodiment, the hull shader 308 may use provided coordinates (e.g., barycentrics for a triangular domain, as shown in Table 1, etc.) to transform any input attributes and determine their values for the diced primitive (e.g., the primitive defined within those coordinates). In another embodiment, the transformation and determination may be applied to position. For example, per vertex positions may be used to calculate tessellation factors, and the hull shader 308 may be used to output those values.

Table 2 illustrates exemplary pseudocode for a domain shader, in accordance with one embodiment. Of course, it should be noted that the pseudocode shown in Table 2 is set forth for illustrative purposes only, and thus should not be construed as limiting in any manner.

TABLE 2

```
//////////////////////////////////////////////////
////
// Transformations in domain shader
//////////////////////////////////////////////////
////
// outputLocation - Location specifying current point, in
original(undiced) triangle primitive
// inputLocation - Location specifying current point within diced
triangle primitive
// barycentrics - barycentric coordinates of diced triangle primitive.
in compressed form.
void TransformBasis(out float3 outputLocation, in float3 inputLocation,
in float2 barycentrics[3])
{
    float2 outputLocation2 =   barycentrics[0] * inputLocation.x +
        barycentrics[1] * inputLocation.y +
        barycentrics[2] * inputLocation.z;
    outputLocation.x = outputLocation2.x;
    outputLocation.y = outputLocation2.y;
    outputLocation.z = 1.0 - outputLocation2.x - outputLocation2.y;
}
```

In one embodiment, the domain shader 310 may perform transformations needed for an input domain location (e.g., a single float3 value for a triangular domain, etc.).

In this way, by storing data for each vertex in the barycentric coordinates buffer 304, and utilizing such buffer 304 with the hull shader 308 and domain shader 310, such buffer 304 may be used at runtime. Additionally, the preprocessing may be manipulated and/or disabled at runtime, which may enable developers to specify a pattern to suit different meshes for particular primitives, thereby easing the adoption of tessellation into the development process. Further, such barycentric coordinates buffer 304 and patch index 306 may be lightweight and may work for all types of models to be rendered, such that model attributes, characteristics, etc. do not change the preprocessing and runtime dicing.

Figure 4:
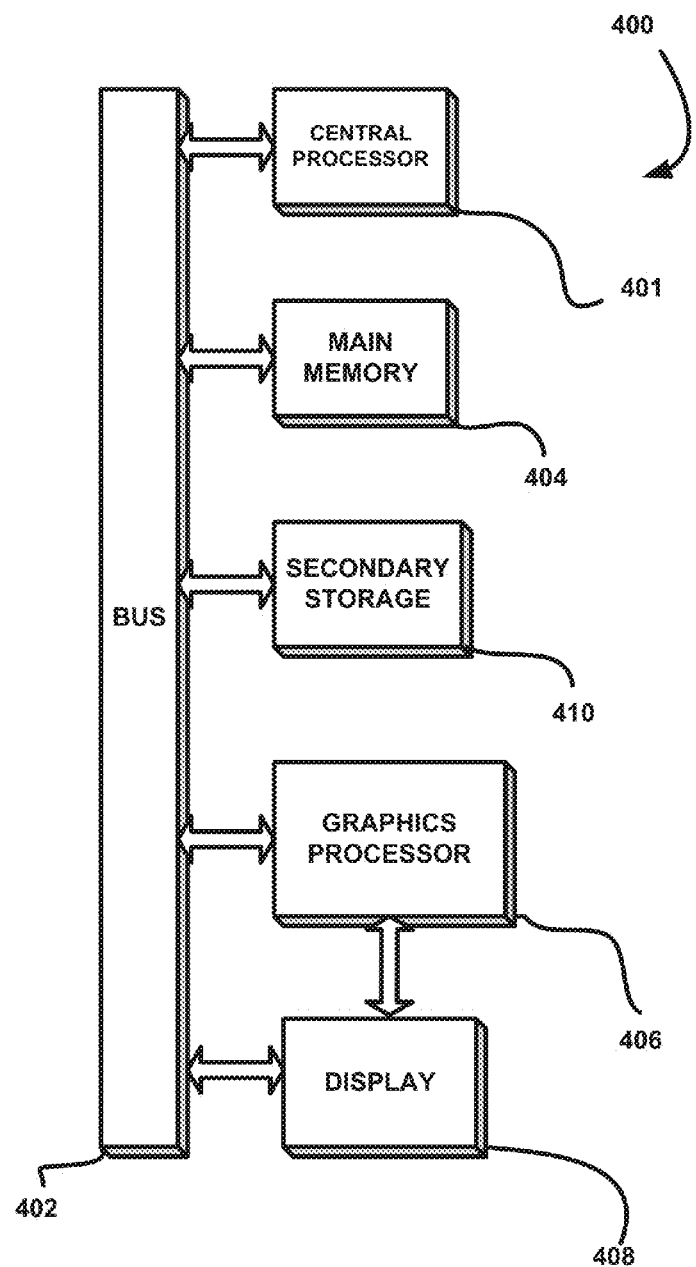
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408. i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising: identifying, utilizing a processor, a primitive to be rendered, the primitive including a plurality of edges; preprocessing the primitive to generate a plurality of barycentric coordinates stored in a buffer; creating a set of diced primitives, wherein each diced primitive in the set of diced primitives is associated with a set of barycentric coordinates in the buffer; and for each diced primitive in the set of diced primitives, processing the diced primitive within a pipeline that includes a hull shader and a domain shader, wherein both the hull shader and the domain shader each is configured to perform transformations based on the corresponding set of barycentric coordinates for the diced primitive.

2. The method of claim 1, wherein preprocessing the primitive to generate the plurality of barycentric coordinates comprises:
   calculating a number of splits along each of the edges of the primitive, and
   selecting a dicing pattern for the primitive based on the number of splits along each of the edges of the primitive,
   wherein the dicing pattern comprises the plurality of barycentric coordinates.

3. The method of claim 1, wherein preprocessing the primitive to generate the plurality of barycentric coordinates comprises:
   performing one or more level of detail calculations, and
   selecting a dicing pattern for the primitive based on the one or more level of detail calculations,
   wherein the dicing pattern comprises the plurality of barycentric coordinates.

4. The method of claim 1, wherein preprocessing the primitive to generate the plurality of barycentric coordinates comprises:
   determining an expansion ratio for the primitive based on a number of splits along each of the edges of the primitive, and
   selecting a dicing pattern for the primitive based on the expansion ratio,
   wherein the dicing pattern comprises the plurality of barycentric coordinates.

5. The method of claim 1, wherein the set of diced primitives comprises a set of duplicate primitives.

6. The method of claim 5, wherein a number of diced primitives in the set of duplicate primitives is equal to an expansion ratio for the primitive, determined during the preprocessing, based on a number of splits along each of the edges of the primitive.

7. The method of claim 1, wherein the hull shader is configured to transform an input attribute associated with a particular diced primitive to generate an output attribute based on the barycentric coordinates for the particular diced primitive.

8. The method of claim 1, wherein the hull shader is configured to calculate tessellation factors for each diced primitive based on per vertex positions.

9. The method of claim 1, wherein the domain shader is configured to transform an input location associated with a particular diced primitive to generate an output location based on the barycentric coordinates for the particular diced primitive.

10. The method of claim 1, wherein the preprocessing may be manipulated or disabled at runtime to specify different patterns of barycentric coordinates.

11. The method of claim 1, wherein the pipeline is implemented within a graphics processing unit (GPU).

12. A computer program product embodied on a non-transitory computer readable medium, comprising: code for identifying, utilizing a processor, a primitive to be rendered, the primitive including a plurality of edges; code for preprocessing the primitive to generate a plurality of barycentric coordinates stored in a buffer; code for creating a set of diced primitives, wherein each diced primitive in the set of diced primitives is associated with a set of barycentric coordinates in the buffer; and for each diced primitive in the set of diced primitives, code for processing the diced primitive within a pipeline that includes a hull shader and a domain shader, wherein both the hull shader and the domain shader each is configured to perform transformations based on the corresponding set of barycentric coordinates for the diced primitive.

13. The non-transitory computer readable medium of claim 12, wherein preprocessing the primitive to generate the plurality of barycentric coordinates comprises: calculating a number of splits along each of the edges of the primitive and selecting a dicing pattern for the primitive based on the number of splits along each of the edges of the primitive, wherein the dicing pattern comprises the plurality of barycentric coordinates.

14. A system, comprising: a processor configured to: identify a primitive to be rendered, the primitive including a plurality of edges, preprocess the primitive to generate a plurality of barycentric coordinates stored in a buffer, create a set of diced primitives, wherein each diced primitive in the set of diced primitives is associated with a set of barycentric coordinates in the buffer, and for each diced primitive in the set of diced primitives, process the diced primitive within a pipeline that includes a hull shader and a domain shader, wherein both the hull shader and the domain shader each is configured to perform transformations based on the corresponding set of barycentric coordinates for the diced primitive.

15. The system of claim 14, wherein preprocessing the primitive to generate the plurality of barycentric coordinates comprises:
calculating a number of splits along each of the edges of the primitive, and
selecting a dicing pattern for the primitive based on the number of splits along each of the edges of the primitive,
wherein the dicing pattern comprises the plurality of barycentric coordinates.

16. The system of claim 14, wherein the pipeline is implemented within a graphics processing unit (GPU) coupled to the processor.

* * * * *